United States Patent [19]

McGinniss et al.

[11] Patent Number: 4,566,906

[45] Date of Patent: Jan. 28, 1986

[54] ANTI-FOULING PAINT CONTAINING LEACHING AGENT STABILIZERS

[75] Inventors: Vincent D. McGinniss, Delaware; Richard J. Dick, Columbus, both of Ohio

[73] Assignee: Chugoku Marine Paints (USA) Inc., New York, N.Y.

[21] Appl. No.: 602,202

[22] Filed: Apr. 19, 1984

[51] Int. Cl.$^4$ ................................................ C09D 5/14
[52] U.S. Cl. ........................... 106/15.05; 106/16; 523/122; 524/329; 524/431
[58] Field of Search ............... 106/15.05, 16, 17, 18; 524/27, 270, 329, 431; 523/122

[56] References Cited

U.S. PATENT DOCUMENTS

| | | | |
|---|---|---|---|
| 4,191,579 | 3/1980 | Hails et al. | 106/15.05 |
| 4,221,839 | 9/1980 | de Graaf | 106/15.05 |
| 4,314,850 | 2/1982 | Watanabe et al. | 106/15.05 |

*Primary Examiner*—Lorenzo B. Hayes
*Attorney, Agent, or Firm*—Mueller and Smith

[57] ABSTRACT

Disclosed is an improved marine anti-fouling coating composition of a thermoplastic binder, an organic solvent, a tin anti-fouling agent, a copper anti-fouling agent, and a water-soluble leaching agent. The improvement in can stability for said coating composition comprises the leaching agent being a water-sensitive, solvent soluble non-cross-linked polymer having an acid number of below about 50 and a $\chi$ value of between about 0.1 and 0.3; or a water-sensitive, solvent soluble, polymer having an acid number of below about 50 and a $\chi$ value between about 0.3 and 0.6. The water sensitive solvent insoluble polymer may be a non-cross-linked oligomer or polymer or a cross-linked hydrogel possessing the requisite acid number and $\chi$ value restriction.

6 Claims, No Drawings

ANTI-FOULING PAINT CONTAINING LEACHING AGENT STABILIZERS

BACKGROUND OF THE INVENTION

The present invention relates to anti-fouling marine coatings and more particularly to novel water-soluble leaching agents therefor.

One of the earliest needs for performance-oriented coatings was in the marine environment. Early formulations were designed around known toxins, such as copper and mercury compounds. 19th Century marine coatings typically used creosote and natural drying oil formulations bearing the toxins. For ship bottoms, presently anti-fouling compounds based on copper and tin commonly are incorporated into somewhat water-sensitive binders to afford gradual breakdown of the film to permit a sustained release of the "poison". This required self-erosion property necessitates frequent repainting of ship bottoms, depending upon location and severity of exposure conditions. With respect to the toxins presently used, toxicity requirements typically restrict anti-fouling agents to be based upon copper and tin, and often combinations of these agents are utilized.

Today's anti-fouling coatings use two general leaching mechanisms, depending on the type of resin matrix selected, soluble or insoluble. The insoluble-matrix type leaves a resinous skeleton intact as the toxicant particles are removed by dissolving into solution in seawater. This is also called the contact type because it depends upon the toxicant migrating to the surface and entering solution by making contact with seawater. Since the resins are somewhat water-permeable, the toxic particles may diffuse through the semipermeable coating, and as one particle dissolves, another is exposed to seawater. The contact type contains several times more toxicant than the soluble type. The resultant thicker films of toxicant provide a longer service life to the anit-fouling topcoats. As a general rule, the insoluble-matrix type of paint does not contain an extender pigment, and the geometry of the dry film requires' high-toxicant loadings (52 to 74 percent by volume) to ensure that the $Cu_2O$ partcles will be in continuous contact with each other. Below the level of cubic packing (52 percent), the resin will encase the $Cu_2O$ particles and prevent solution; above the level of hexagonal packing (74 percent), the coating will be too resin-poor to maintain film integrity. These figures may vary somewhat in actual practice, and it is common to adjust the leaching rate and the effective range of toxicant loading, (e.g., by the addition of rosin or other natural resins). In commercial practice, both natural resins and extender pigments are frequently used. When high levels of rosin are used and high erosion might be expected, tougheners such as ester gum, ethyl cellulose, and modified rubbers are added. "Paint Handbook" G. E. Weismantel, McGraw-Hill, New York, N.Y., pp 14–43 and 14–44 (Chapter 14 "Marine Paints" authored by R. J. Dick).

One problem plaguing anti-fouling marine coatings containing multiple toxicants is the apparent loss of anti-fouling activity expressed by coatings over extended periods of storage. Thus, the need for improved storage stability of anti-fouling marine coatings is manifest. The present invention is directed towards the improvement of the can or storage stability of anti-fouling marine coatings containing ore than one toxicant.

BROAD STATEMENT OF THE INVENTION

The present invention is addressed to a marine anti-fouling coating composition of a thermoplastic or thermosetting binder, an organic solvent, a tin anti-fouling agent, a copper anti-fouling agent, and a water-soluble leaching agent. The present invention provides for improved can stability by suppressing undesirable interaction of the leaching agent with the tin anti-fouling agent. The improved marine anti-fouling coating comprises a leaching agent which is water-sensitive, has an acid number of 50 or less, and a $\chi$ factor of between about 0.1 and 0.6. The leaching agent may be a solvent-soluble non-cross-linked oligomer or polymer ($\chi$ factor of between about 0.1 and about 0.3); a solvent-insoluble non-cross linked oligomer or polymer ($\chi$ factor of between about 0.3 and 0.6); or a solvent-insoluble cross-linked polymeric hydrogel ($\chi$ factor of between about 0.3 and 0.6). For additionally suppressing undesirable interaction between the tin and the copper anti-fouling agents, the copper anti-fouling leaching agent may be coated with a leaching agent which possesses the named low acid number and $\chi$ value range. Additionally, water sensitive chelating agents and anti-oxidants (AN of 0–50, $\chi=0.1-0.6$) should be used in the anti-fouling paint for minimizing loss of activity of the anti-fouling agents and improving their release in use.

Advantages of the present invention include the ability to extend the useful can stability or storage life of the anti-fouling marine coating composition while maintaining the anti-fouling properties thereof. Another advantage is the ability to provide improved anti-fouling properties of the marine coatings by permitting higher effective levels of anti-fouling agent to be present therein. These and other advantages will be readily apparent to those skilled in the art based upon the disclosure herein.

DETAILED DESCRIPTION OF THE INVENTION

Conventional marine anti-fouling coating compositions are solvent-based which means that some degree of solvent compatability is placed upon the ingredients in general and upon the leaching agents in particular. Typical solvent systems for marine anti-fouling coatings include aromatic or ketone solvents. Additionally, the leaching agent must be water sensitive in order to permit the continued, gradual release of the anti-fouling agents from the coated film for attaining the anti-fouling properties required of the coating. Thus, for providing stable, one-package marine anti-fouling coating compositions, a balance between solvent compatibility and water sensitivity must be struck. At the same time, the leaching agent must remain inert towards chemical and physical interactions with the tin and copper anti-fouling agents in the coating composition. Rosin predominates as the leaching agent which the marine anti-fouling coatings industry has turned to for providing the requisite degree of solvent compatibility and water sensitivity required of the leaching agents. Unfortunately, work on the present invention has revealed that the loss of activity of the anti-fouling marine coatings can be traced to a reduction of tin anti-fouling agent which occurs over extended periods of storage of the coatings. The loss of tin anti-fouling, in turn, agent has been traced to an undesirable interaction between the rosin or rosin-based leaching agents and the tin anti-fouling agents. The novel leaching agents of the present invention overcome this problem.

The method utilized to determine solvent compatibility in conjunction with water sensitivity of the leaching agents involves the determination of the $\chi$ factor of the candidate leaching agents. The $\chi$ factor is based upon the McGinniss predictive relationship as defined in *Organic Coatings and Plastics Chemistry*, Vols. 39 and 46, pp 529–534, and 214–223, respectively, (1978 and 1982, respectively). The McGinniss predictive relationship defines the $\chi$ factor as the weight fraction of heteroatoms contained in the monomer or in the monomer repeat unit of an oligomer or polymer. Since the McGinniss predictive relationship revealed that the $\chi$ factor was the key parameter in adjudging solvent compatibility in conjunction with water sensitivity, correlation of this key factor with solvent compatibility and water sensitivity of a variety of known compounds was undertaken. A listing of a variety of water sensitive and non-water sensitive materials, and their respective values, are set forth in the tables below.

TABLE 1

| ALCOHOL-WATER SENSITIVITIES | | | | |
|---|---|---|---|---|
| Alcohols | Mol Wt. | Alcohol Solubity in H$_2$O, % | H$_2$O Solubility in Alcohol, % | $\chi$ Value |
| Methanol | 32.04 | 100 | | 0.50 |
| Ethanol | 46.07 | 100 | | 0.35 |
| Propanol | 60.09 | 100 | | 0.27 |
| Butanol | 74.12 | 7.7 | 20.1 | 0.22 |
| sec-Butanol | 74.12 | 29.1 | 36.3 | 0.22 |
| Amyl alcohol | 88.15 | 2–4 | 8 | 0.18 |
| iso-Butanol | 74.12 | 10 | 15 | 0.22 |
| Cyclohexanol | 100.16 | 3.6 | 20 | 0.16 |
| Hexyl alcohol | 102.17 | 0.58–1.7 | 6–7 | 0.16 |
| Heptanol | 116.20 | 0.45 | 3.03 | 0.14 |
| Octyl alcohol | 130.22 | 0.03 | 2 | 0.122 |
| Ethylene glycol | 62.07 | 100 | | 0.52 |
| Propylene glycol | 76.09 | 100 | | 0.42 |
| 1,3-Butanediol | 90.12 | 100 | | 0.36 |
| Glycerol | 92.09 | 100 | | 0.52 |
| 2-Ethyl-1,3-hexanediol | 146.22 | 4.2 | 11.7 | 0.22 |
| Diisobutyl-carbinol | 144.25 | 0.6 | 1 | 0.11 |

TABLE 2

| KETONE-WATER SENSITIVITES | | | | |
|---|---|---|---|---|
| Ketones | Mol Wt. | Ketone Solubility in H$_2$O, wt % | H$_2$O Solubility in Ketone, wt % | $\chi$ Value |
| Acetone | 58.08 | 100 | | 0.27 |
| Methyl ethyl ketone | 72.10 | 26.8 | 11.8 | 0.22 |
| Methyl n-propyl ketone | 86.13 | 4.3 | 3.3 | 0.19 |
| Diethyl ketone | 86.13 | 3.4 | 2.6 | 0.19 |
| Cyclohexanone | 98.14 | 2.3 | 8 | 0.16 |
| Methyl iso-butyl ketone | 100.16 | 2 | 1.8 | 0.16 |
| Methyl n-butyl ketone | 100.16 | 3 | 4 | 0.16 |
| Ethyl n-butyl ketone | 114.18 | 1.43 | 0.78 | 0.14 |
| Methyl isoamyl ketone | 114.18 | 0.43 | 1.5 | 0.14 |
| Diisobutyl ketone | 162.23 | 0.05 | 0.75 | 0.11 |

TABLE 3

| ESTER-WATER SENSITIVITIES | | | | |
|---|---|---|---|---|
| Esters | Mol Wt. | Ester Solubility in H$_2$O, wt % | H$_2$O Solubility in Ester, wt % | $\chi$ Value |
| Methyl formate | 60.3 | 23.3 | 19.8 | 0.53 |
| Ethyl formate | 74.08 | 13.6 | 4.5 | 0.43 |
| Methyl acetate | 74.08 | 24.5 | 8.2 | 0.43 |
| Ethylene carbonate | 88.06 | 100 | | 0.54 |

TABLE 3-continued

| ESTER-WATER SENSITIVITIES | | | | |
|---|---|---|---|---|
| Esters | Mol Wt. | Ester Solubility in H$_2$O, wt % | H$_2$O Solubility in Ester, wt % | $\chi$ Value |
| Ethyl acetate | 88.10 | 8.7 | 3.3 | 0.36 |
| n-Butyl acetate | 116.16 | 0.68 | 1.2 | 0.27 |
| Methyl amyl acetate | 144.21 | 0.13 | 0.58 | 0.22 |
| 2-Ethyl hexyl acetate | 172.26 | 0.03 | 0.55 | 0.19 |

TABLE 4

| ETHER-WATER SENSITIVITIES | | | | |
|---|---|---|---|---|
| Ethers | Mol Wt. | Ether Solubility in H$_2$O, wt % | H$_2$O Solubility in Ether wt % | $\chi$ Value |
| Tetrahydrofuram | 72.10 | 100 | | 0.22 |
| Ethyl ether | 74.12 | 6.9 | 1.3 | 0.22 |
| Tetrohydropyran | 86.13 | 00 | | |
| Dioxane | 88.10 | 100 | | |
| Iospropyl ether | 102.17 | 0.90 | 0.57 | 0.16 |
| Ethyl n-butyl ether | 102.17 | 0.44 | 0.8 | 0.16 |
| Diethyl Cellosolve | 118.17 | 21 | 7.4 | 0.27 |
| n-Butyl ether | 130.22 | 0.3 | 0.19 | 0.123 |
| Dibutyl Cellosolve | 174.28 | 0.2 | 0.6 | 0.18 |
| n-Hexyl ether | 186.33 | 0.01 | 0.12 | 0.09 |

A direct relationship between the proportion of the materials soluble in water and the proportion of water soluble in the materials can be observed in the above-tabulated information. Materials that are highly sensitive to solubilization by water also are susceptible to strong water absorption phenomena. There is, however, a distinction which must be drawn between alcohols and other oxygenated materials in that alcohols tend to absorb more water or there is a higher percentage of water in alcohols at a given solubility value than for esters, ethers, or ketones. Nevertheless, it will be observed that a strong correlation between the $\chi$ values of the compounds and their water absorbancy values can be seen from the above-tabulated data.

With specific reference to the above-tabulated data, it will be observed that alcohols, ethers, and ketones having $\chi$ values in the range of about 0.15 to about 0.5 possess high water sensitivity while esters with $\chi$ values in the range of 0.4 to 0.6 had relatively low water sensitivities. Low $\chi$ values, eg. 0 to 0.2, for all materials result in relatively low water sensitivities, but high non-aqueous solvent solubility characteristics which also is a necessary characteristic of the leaching agents of the present invention.

With confidence in the correlation between water sensitivity and $\chi$ factor, a number of polymeric materials were investigated as to their water sensitivities and $\chi$ factors. The data uncovered is set forth in Table 5 below.

TABLE 5

| POLYMER-WATER SENSITIVITIES | | | |
|---|---|---|---|
| Polymer | Monomer Mol Wt. Repeat Unit | H$_2$O Solubility in Polymer, wt % | $\chi$ Value |
| Polystyrene | 104.1 | 0.048 | 0 |
| Polyisobutylmethacrylate | 142.2 | 0.64 | 0.23 |
| Polyethylmethacrylate | 114.1 | 0.72 | 0.28 |
| Polymethylmethacrylate | 100.1 | 1.18 | 0.32 |
| Polyvinylacetate | 86.1 | 2.2 | 0.37 |
| Polyacrylonitrile | 53.1 | 2.2 | 0.50 |
| Polymethyl vinyl ketone | 70.1 | 2.88 | 0.23 |

TABLE 5-continued

| POLYMER-WATER SENSITIVITIES | | | |
| --- | --- | --- | --- |
| Polymer | Monomer Mol Wt. Repeat Unit | H₂O Solubility in Polymer, wt % | χ Value |
| Polyvinyl alcohol | 44.1 | 18 | 0.36 |
| Polyacrylic acid | 72.1 | 18 | 0.44 |
| Polymethacrylic acid | 86.1 | 9.72 | 0.37 |
| Polyvinylamine | 43 | 30 | 0.32 |
| Polyhydroxyethyl acrylate | 116 | 10–18 | 0.41 |
| Polyhydroxyethyl methacrylate | 130 | 5–9 | 0.37 |
| Polyvinylisobutyl ether | 100.2 | 0.36 | 0.16 |
| Polymethylene oxide | 30 | — | 0.53 |
| Polyethylene oxide | 44 | — | 0.36 |
| Polypropylene oxide | 58.1 | — | 0.27 |
| Rosin (abietic acid) | 302.46 | — | 0.1 |

The above values of water absorption were taken from "Diffusion in Polymers" edited by J. Crank and G. S. Park, Academic Press, New York, NY, pp 259–313 (Chapter 8 authored by J. A. Barrie), 1968. It will be observed that polymeric materials having high χ values, eg. about 0.3 to about 0.6, display the greatest water sensitivity values (1%–3.7% for vinyl esters and 3%–30% for vinyl acids, amines, and alcohols), while polymers having low χ values, eg. 0 to about 0.3, had little water sensitivity, but exhibited excellent solvent solubility characteristics. Note that rosin has an ionizable functional group and a low χ value of 0.1, but is water sensitive and has excellent water solubility characteristics. Unfortunately, rosin also causes destruction of the tin anti-fouling agents through interaction therewith during extended periods of storage.

Generally speaking, polymers having χ values ranging from about 0.1 to about 0.3 tend to be relatively soluble, or at least readily dispersable, in organic solvents while polymers having χ values ranging from about 0.3 to about 0.6 tend to be relatively insoluble in solvents. By contrast, the lower ranged χ value polymers also tend to be less water sensitive while the higher valued χ factor polymers tended to be more water sensitive. In any event, leaching agents having relatively low acid values, eg. less than 50, and possessing a χ factor ranging from about 0.1 to about 0.6, appear to be suitable candidates for use as leaching agents in marine anti-fouling coating compositions. The Examples will further confirm the appropriateness in using the χ factor as the determinative parameter for relating and balancing solvent solubility and water sensitivity for the leaching agents of the present invention.

Suitable leaching agents which possess the requisite low acidity and χ values for use as leaching agents in marine anti-fouling coatings include, for example, alkoxylated derivatives of benzene tricarboxylic acid or anhydride; alkoxylated rosin; copolymers of styrene and hydroxy propyl acrylate or methacrylate; copolymers of 2-ethyl hexyl acrylate and hydroxy propyl acrylate or methacrylate; copolymers of 2-ethyl hexyl acrylate and n-vinyl pryolidone; copolymers of trimellitic anhydride and alkylene oxides; and copolymers of dimorpholine and diglycidyl ether of bis-phenol A. Further useful leaching agents include modified sugars (sucrose) including, for example, reaction products of sugar, maleic anhydride, and alkylene oxides; sugar, N-vinyl pyrrolidone, and maleic anhydride; sugar, N-vinyl pyrrolidone, and benzene tricarboxylic anhydride; and sugar (eg. a sacchariferous material) and fatty acids. Further useful leaching agents include, for example, various starches, polyvinyl alcohol, polyhydroxy ethyl acrylate, crosslinked polyhydroxy ethyl acrylate (a hydrogel), and the like and mixtures thereof.

The foregoing exemplary leaching agents are reacted in proportions for providing the requisite low acid number and for providing χ values within the range set forth herein. The examples will provide more detail on these leaching agents. The proportion of leaching agent in the marine anti-fouling coating composition should be an effective amount for providing protection of the surface upon which the coating is applied. Such effective amount typically ranges from between about 1 and 50 percent by weight of the non-volatile solids. Additional ingredients which make up the marine anti-fouling coating compositions include thermoplastic or thermosetting binders, typically such binders being vinyl thermoplastic polymers. As noted above, ketone and aromatic solvents are preferred by the industry as the organic solvent of choice. The types of tin anti-fouling and copper anti-fouling agents, as well as other ingredients useful in anti-fouling marine coatings can be found by reference to Anti-Fouling Marine Coatings, Noyes Data Corporation, Park Ridge, N.J. (1973). The preferred tin anti-fouling agent for use in the marine anti-fouling coating of the present invention is tri-phenyl tin hydroxide and the preferred copper anti-fouling agent is copper hydroxide.

It should be noted that once the stability of the tin anti-fouling agent was achieved by use of the novel leaching agents of the present invention, storage stability of the composition still was lacking on occasion. It was determined that the tin and copper anti-fouling agents apparently were engaged in a secondary interaction which lowered the effective amount of tin anti-fouling agent available for providing protection of the coated surfaces. Apparently, the high reactivity which many copper anti-fouling agents possess significantly contributes to this undesirable interaction. The art has proposed encapsulating copper anti-fouling agents as disclosed in U.S. Pat. No. 4,253,877. It should be noted that in harmony with these proposals, it has been determined that encapsulation, eg. microencapsulation, of the copper anti-fouling agents effectively suppresses the undesirable interaction between the tin and the copper anti-fouling agents. While conventional encapsulants may be used for this purpose, it is distinctly preferred to use leaching agents of the present invention in order not to introduce high acidity into the system which would additionally undesirably interact with the the tin anti-fouling agent. Thus, the novel leaching agents of the present invention are recommended and preferred for use in encapsulating the copper anti-fouling agents for use in the marine anti-fouling coatings of the present invention. The examples will amplify on this aspect of the invention also.

For providing still further stability of the marine anti-fouling paints of the present invention, it has been determined that specific anti-oxidant polymeric materials and chelating polymeric materials significantly contribute to the stability of the paint. Such stability is manifest in a preservation of the activity of the tin anti-fouling agent and suppression of undesirable interactivity between the tin and copper anti-fouling agents. Such chelating polymers and anti-oxidant polymers preferably are oligomeric or polymeric and are made to be water-sensitive for imparting additional leaching of the anti-fouling agents from the paint in use. The criteria set forth above with respect to water-sensitive leaching agents apply to the new class of water-sensitive anti-oxidant polymers and water sensitive chelating polymers disclosed herein. That is, the anti-oxidant polymers and chelating polymers have an acid number which is not substantially above 50 and preferably are non-ionic, eg. essentially a 0 acid number. Moreover, the $\chi$ value of such compounds should be within the range of about 0.1–0.6 in order that such materials possess the requisite balance of solvent solubility and water sensitivity required in the use in the marine anti-fouling paint of the present invention. An example of a water-sensitive chelating polymer would be polyvinylpyridene, for example prepared from 4-vinylpyridene placed in toluene solvent (50% non-volatile solids) in the presence of about 0.5% azoisobutyronitrile initiator. Such mixture can be heated at reflux for about 8 hours to produce the viscous polyvinylpyridene toluene solution which may be used as a water leaching agent and a scavenger for copper ions which helps promote anti-fouling paint formulation stability. Such a water-sensitive chelating polymer would possess an acid number of 0 and a $\chi$ value of about 0.15. An example of a water-sensitive anti-oxidant polymer is the condensation product of hydroquinone (1 mole) and formaldehyde (1.5 moles) utilizing barium hydroxide octohydrate or other catalyst. Details of experimental procedure for preparing such phenolic resins can be found, for example, in the text by Sorenson and Campbell, "Preparative Methods of Polymer Chemistry", Interscience Publishing Company, John Wiley & Sons, New York N.Y. Such phenolic resin would possess an acid number of 0 and a $\chi$ value of about 0.31.

Thus, it will be appreciated that the copper encapsulating agents, water sensitive chelating polymers, and water sensitive anti-oxidant polymers each possess a low acid number for maintaining the stability of the tin anti-fouling agents in the paint. By properly interacting with the copper anti-fouling agent by coating, chelating, or similar function, the tin and the copper anti-fouling agents do not undesirably interact which would otherwise cause loss of stability and activity of the marine anti-fouling paint. Such materials additionally possess the requisite balance between solvent solubility and water sensitivity which can only impart further improved performance to the anti-fouling paints as described above.

The following examples show how the invention has been practiced but should not be construed as limiting. In this application, all percentages and proportions are by weight and all units are in the metric system, unless otherwise expressly indicated. Also, all citations referred to herein are expressly incorporated herein by reference.

EXAMPLES

EXAMPLE 1

Several candidate leaching agents were synthesized for evaluation. The ingredients and their proportion, and the resulting acid number and $\chi$ value of the polymers synthesized are set forth below in Table 6.

TABLE 6

| Leaching agent | Ingredient | Amount (wt %) | Acid Number | $\chi$ Value |
|---|---|---|---|---|
| 4 | 1,2,4-Benzenetricarboxylic anhydride | 49 | 100 | 0.3–0.4 |
|  | Propylene oxide | 51 |  |  |
|  | N,N—Diethylanaline catalyst | 1 |  |  |
| 44 | 1,2,4-Benzenetricarboxylic anhydride | 49 | 35 | 0.3–0.4 |
|  | Propylene oxide | 51 |  |  |
|  | N,N—Diethylanaline catalyst | 1 |  |  |
| 52/53 | 1,2,4-Benzenetricarboxylic anhydride | 49 | 20 | 0.3–0.4 |
|  | Propylene oxide | 51 |  |  |
|  | N,N—Diethylanaline catalyst | 1 |  |  |
| 22/25 | Rosin | 33 | 20 | 0.13 |
|  | Propylene oxide | 67 |  |  |
|  | Benzyldimethylamine catalyst | 1 |  |  |
| 54/55 | Rosin | 33 | 24 | 0.13 |
|  | Propylene oxide | 67 |  |  |
|  | Benzyldimethylamine catalyst | 1 |  |  |
| 56A | Styrene | 34 | 0 | 0.25 |
|  | Hydroxylpropylmethacrylate | 66 |  |  |
|  | Azobisisobutyronitrile catalyst | 0.5 |  |  |
| 56B | Styrene | 60 | 0 | 0.15 |
|  | Hydroxylpropylmethacrylate | 40 |  |  |
|  | Azobisisobutyronitrile | 0.5 |  |  |
| 57A | 2-Ethylhexyl acrylate | 25 | 0 | 0.33 |
|  | Hydroxypropyl methacrylate | 75 |  |  |
|  | Azobisisobutyronitrile catalyst | 0.5 |  |  |
|  | Toluene solvent | 100 g |  |  |
| 57B | 2-Ethylhexyl acrylate | 75 | 0 | 0.21 |
|  | Hydroxypropyl methacrylate | 25 |  |  |
|  | Azobisisobutyronitrile catalyst | 0.5 |  |  |
|  | Toluene solvent | 100 g |  |  |
| 57C | 2-Ethylhexyl acrylate | 80 | 0 | 0.30 |
|  | N—Vinylpyrrolidone | 20 |  |  |
|  | Azobisisobutyronitrile catalyst | 0.5 |  |  |
|  | Toluene solvent | 100 g |  |  |
| 60 | Dimorpholine | 67 | 0 | 0.24 |
|  | Diglycidyl ether of bisphenol A | 33 |  |  |

The significance of the acid number and $\chi$ value of the polymers will be demonstrated below.

EXAMPLE 2

Four of the candidate leaching agents of Example 1 were selected for evaluation of their water absorptivity: leaching agents 56A, 56B, 57A, and 57C. Based upon the water solubility data presented in Table 5, the water absorptivity of the candidate leaching agents can be predicted and compared to experimentally determined water absorptivity values. The results of such work are reported below in Table 7.

TABLE 7

| Leaching Agent | χ Value | Water Absorption (wt %) | |
|---|---|---|---|
| | | Predicted | Actual |
| 56B | 0.15 | 1.0 | 0.93 |
| 56A | 0.25 | 1.1 | 1.03 |
| 57C | 0.30 | 3.2 | 3.38 |
| 57A | 0.34 | 4.25 | 4.33 |

It will be observed that the predicted and actual water absorption values are remarkably close. This means that the χ values of the polymers can be used to accurately predict water absorptivity values. It will be observed also that as the χ values increase, so does the water absorptivity of the polymers. Not readily apparent here, but addressed below, is the corresponding loss of solvent solubility with increasing χ values.

EXAMPLE 3

Next, the stability of the tin anti-fouling agents in the presence of various leaching agent candidates was evaluated. The basic formulation evaluated is set forth in Table 8 below.

TABLE 8

| Ingredient | Amount (weight parts) |
|---|---|
| Laroflex MP-45 copolymer of vinyl chloride and vinyl isobutyl ether (75/25), BASF Wyandotte | 14 |
| Arcon P-100 hydrogenated petroleum resin (100° C. MP) | 4 |
| Cu$_2$O | 70 |
| Triphenyl tin hydroxide (TPTH) | 26 |
| Red iron oxide | 6 |
| ZnO | 10 |
| Toyoparacs 150 chlorinated paraffin 40 | 4 |
| Disparon 4200 polyethylene wax | 4 |
| Xylene | 50.2 |
| Methyl isobutyl ketone | 4 |

The leaching agents evaluated are set forth below:

TABLE 9

| Formulation No. | Type | Leaching Agent Amount (wt %) | Acid No. |
|---|---|---|---|
| 2B | None | — | — |
| 2C | Wood rosin | 1.0 | >155 |
| 2D | Wood rosin | 3.0 | >155 |
| 2E | Wood Rosin | 5.0 | >155 |
| 3A | 44[1] | 1.0 | 35 |
| 3B | 44[1] | 3.0 | 35 |
| 3C | 44[1] | 5.0 | 35 |
| 6C | 54/55[2] | 5.0 | 24 |

[1]supplied at 50% solids in MIBK
[2]supplied at 66.7% solids in MEK

Each formulation was stored at indoor ambient room temperature and the presence of TPTH anti-fouling agent determined by infrared (IR) spectroscopy. The following results were recorded.

TABLE 10

| Storage Time (mos) | Formulation No.* | | | | | | | |
|---|---|---|---|---|---|---|---|---|
| | 2B | 2C | 2D | 2E | 3A | 3B | 3C | 6C |
| 1 | * | * | * | * | * | * | * | * |
| 2 | * | * | * | * | * | * | * | * |
| 3 | * | * | * | * | * | * | * | * |
| 4 | * | * | * | * | * | * | * | * |
| 5 | * | * | * | * | * | * | * | * |

TABLE 10-continued

| Storage Time (mos) | Formulation No.* | | | | | | | |
|---|---|---|---|---|---|---|---|---|
| | 2B | 2C | 2D | 2E | 3A | 3B | 3C | 6C |
| 8 | * | tr | 0 | 0 | * | * | * | * |

*means the presence of tin after the indicated storage times.
0 means the absence of tin after the indicated storage times.
tr means a trace presence of tin after the indicated storage times.

It will be observed that the only formulations which lost the tin anti-fouling agent were the formulations containing the high acid number rosin leaching agent. Note especially Formulation 6C using leaching agent 54/55 (rosin modified with propylene oxide to a low acid number) which retains the tin. The low acid number requirement for retention of the tin anti-fouling agent, thus, is demonstrated.

EXAMPLE 4

Various leaching agent candidates were evaluated for their solubility (compatibility) in aromatic solvent, water sensitivity, and TPTH stability. The following test procedures were employed:

Aromatic Solvent Solubility

The leaching agent candidate was added to xylene (20 wt-%) at room temperature. A rating of "Good" represents a clear solution of polymer and xylene solvent; "No" or "Poor" indicates a two-phase or partially soluble polymer and solvent; and "Poor/Good" indicates an initial clear solution which in time develops some insolubility characteristics.

TPTH Stability

Triphenyl tin hydroxide (TPTH, 10 wt-%) is added to the leaching agent dispersed at 10% in toluene solvent. A rating of "None" represents loss of IR absorption bands in the 600–1,000 cm$^{-1}$ or 10–20 micron regions within one week storage time at room temperature. A rating of "Good" represents storage stability, ie. presence of TPTH, for at least one month at room temperature.

Water Sensitivity

A rating of "Good" represents the loss of greater than 200 mg of material per 10 cm$^2$ coated area on a panel immersed in sea water for 7 days.

The results recorded are displayed in Table 11 below.

TABLE 11

| Leaching Agent | Aromatic Solvent Solubility | TPTH Stability | Water Sensitivity | Acid Number | χ Value |
|---|---|---|---|---|---|
| Rosin | Good | None | Good | 155 | 0.10 |
| Polyethylene glycol (750) | Good | Good | Good | 0 | 0.36 |
| Polyethylene glycol (1000) | No | Good | Good | 0 | 0.36 |
| 22/25 | Good | Good | Good | 20 | 0.13 |
| 54/55 | Good | Good | Good | 24 | 0.13 |
| 52/53 | Poor/Good | Good | Good | 20 | 0.3–0.4 |
| 4 | Poor/Good | None | Good | 100 | 0.3–0.4 |
| 56A | Good | Good | Good | 0 | 0.25 |
| 56B | Good | Good | Good | 0 | 0.15 |
| 57A | Poor | Good | Good | 0 | 0.33 |
| 57B | Good | Good | Good | 0 | 0.21 |
| 57C | Good | Good | Good | 0 | 0.30 |
| 1551 Starch | No | Good | Good | 0 | 0.49 |
| PVOH | No | Good | Good | 0 | 0.36 |
| PHEA | No | Good | Good | 0 | 0.32 |

The above-tabulated results confirm the acid number and $\chi$ value limitations required of the leaching agents of the present invention. Acid numbers of 50 or greater are to be avoided in order to preserve tin stability. Leaching agents with $\chi$ values of 0.1–0.3 tend to possess good aromatic solvent compatibility and acceptable water sensitivity. Leaching agents with $\chi$ values of 0.3–0.6 tend to possess better water sensitivity but only acceptable aromatic solvent solubility. An acceptable balance of aromatic solvent compatibility and water sensitivity is struck for polymers/oligomers with $\chi$ values ranging from about 0.1 to 0.6.

We claim:

1. In a marine anti-fouling coating composition of a thermoplastic binder, an organic solvent, a tin anti-fouling agent, a copper anti-fouling agent, and a water-soluble leaching agent, the improvement comprising, as said leaching agent, a water-sensitive, solvent-soluble, non-cross-linked oligomer or polymer having an acid number of below about 50 and a $\chi$ value of between about 0.1 and 0.3 in an amount sufficient to increase can stability of the coating composition.

2. The marine anti-fouling coating composition of claim 1 wherein said tin anti-fouling agent comprises triphenyl tin hydroxide.

3. The marine anti-fouling coating composition of claim 1 wherein said leaching agent is selected from the reaction product of trimellitic anhydride and an alkylene oxide; the reaction product of rosin and an alkylene oxide; a copolymer of styrene and hydroxy alkyl acrylate or methacrylate; a copolymer of N-vinylpyrrolidone and an alkyl acrylate or methacrylate; the adduct of dimorpholine and diglycidyl ether of bisphenol A and mixtures thereof.

4. The marine anti-fouling coating composition of claim 1 wherein said leaching agent is present in a weight percent of between about 1 and 50% by weight of the non-volatile solids.

5. The marine anti-fouling coating composition of claim 1 wherein said leaching agent comprises the reaction product of a sacchariferous material and a carboxylic acid.

6. The marine anti-fouling coating compsition of claim 1 wherein the copper anti-fouling agent is coated with said leaching agent.

* * * * *